US011153760B2

(12) United States Patent
Silverman et al.

(10) Patent No.: US 11,153,760 B2
(45) Date of Patent: Oct. 19, 2021

(54) SPATIAL REUSE (SR) OPTIMIZATION IN WIRELESS NETWORKS USING SENSOR NODES AND ACTUAL PACKET COLLISION MEASUREMENTS

(71) Applicant: Cisco Technology, Inc., San Jose, CA (US)

(72) Inventors: Matthew Aaron Silverman, Shaker Heights, OH (US); Daniel Joseph Lyons, Medina, OH (US); Pooya Monajemi, Irvine, CA (US); John Matthew Swartz, Lithia, FL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 180 days.

(21) Appl. No.: 16/293,218

(22) Filed: Mar. 5, 2019

(65) Prior Publication Data

US 2020/0288323 A1     Sep. 10, 2020

(51) Int. Cl.
*H04W 16/10* (2009.01)
*H04W 74/08* (2009.01)
(Continued)

(52) U.S. Cl.
CPC .......... *H04W 16/10* (2013.01); *H04B 17/336* (2015.01); *H04L 1/0038* (2013.01);
(Continued)

(58) Field of Classification Search
CPC .. H04B 17/318; H04B 17/336; H04B 7/0452; H04L 1/0038; H04W 16/02;
(Continued)

(56) References Cited

U.S. PATENT DOCUMENTS 9,467,986 B2   10/2016  Lyons
9,866,416 B2    1/2018  Lyons
(Continued)

OTHER PUBLICATIONS

Afaqui, et al., "IEEE 802.11ax: Challenges and requirements for future high efficiency Wi-Fi," IEEE Wireless Communications, vol. 24, Issue 3, Jun. 2017, 9 pages.
(Continued)

*Primary Examiner* — Saad A. Waqas
(74) *Attorney, Agent, or Firm* — Edell, Shapiro & Finnan, LLC

(57) ABSTRACT

In one illustrative example, a device configured for use in a wireless local area network (WLAN) may cause a spatial reuse (SR) adjustment to be performed based on data received from a multi-user receiver procedure for the blind detection and demodulation of colliding packets from multiple stations. This procedure may be performed by one or more access points (APs) and/or distributed sensor nodes, each having such a multi-user receiver. The procedure may involve receiving and decoding, over a channel, a first spatial stream from a first device of a first base service set (BSS) color; simultaneously receiving and decoding, over the channel, a second spatial stream from a second device of a second BSS color (i.e. an overlapping BSS or "OBSS"); and calculating a signal-to-interference ratio (SIR) based on signal levels associated with the streams. The SR adjustment may involve adjusting an OBSS Packet Detect (PD) (OBSS-PD) threshold.

20 Claims, 14 Drawing Sheets

(51) Int. Cl.

| | |
|---|---|
| *H04L 1/00* | (2006.01) |
| *H04W 72/04* | (2009.01) |
| *H04B 17/336* | (2015.01) |
| *H04W 72/08* | (2009.01) |
| *H04W 80/08* | (2009.01) |
| *H04W 72/12* | (2009.01) |
| *H04W 16/14* | (2009.01) |
| *H04B 7/0452* | (2017.01) |
| *H04W 84/12* | (2009.01) |

(52) U.S. Cl.
CPC ......... *H04W 16/14* (2013.01); *H04W 72/046* (2013.01); *H04W 72/082* (2013.01); *H04W 72/1231* (2013.01); *H04W 74/0825* (2013.01); *H04W 80/08* (2013.01); *H04B 7/0452* (2013.01); *H04W 84/12* (2013.01)

(58) Field of Classification Search
CPC ....... H04W 16/10; H04W 16/14; H04W 4/38; H04W 4/80; H04W 72/046; H04W 72/082; H04W 72/1231; H04W 74/0825; H04W 80/08; H04W 84/12
See application file for complete search history.

(56) References Cited

U.S. PATENT DOCUMENTS

| | | | |
|---|---|---|---|
| 10,021,694 B2 | 7/2018 | Noh et al. | |
| 10,397,933 B1* | 8/2019 | Mu | ..................... H04W 72/082 |
| 10,986,517 B2* | 4/2021 | Oteri | ..................... H04W 52/34 |
| 2016/0219461 A1* | 7/2016 | Huang | .............. H04W 74/0808 |
| 2016/0255656 A1* | 9/2016 | Lou | ........................... H04L 1/16 370/335 |
| 2017/0086226 A1 | 3/2017 | Wang | |
| 2017/0105217 A1 | 4/2017 | Kwon | |
| 2017/0135131 A1 | 5/2017 | Hart et al. | |
| 2017/0223710 A1 | 8/2017 | Cariou et al. | |
| 2017/0230837 A1 | 8/2017 | Huang et al. | |
| 2017/0289987 A1 | 10/2017 | Seok | |
| 2018/0132278 A1* | 5/2018 | Oteri | ................. H04W 74/0808 |
| 2018/0249503 A1 | 8/2018 | Kim et al. | |
| 2019/0007856 A1 | 1/2019 | Desai | |
| 2019/0014536 A1 | 1/2019 | Desai et al. | |
| 2019/0268776 A1* | 8/2019 | Eitan | ................. H04W 74/0816 |
| 2019/0313328 A1* | 10/2019 | Ma | ........................ H04B 17/345 |
| 2020/0077273 A1* | 3/2020 | Cherian | ................ H04W 16/02 |
| 2020/0288499 A1* | 9/2020 | Wei | ................... H04W 72/1278 |

OTHER PUBLICATIONS

Cisco, "IEEE 802.11ax: The Sixth Generation of Wi-Fi," Technical White Paper, Jun. 2018, 15 pages.
Cisco, "Cisco Aironet Sensor Deployment Guide," https://www.cisco.com/c/en/us/td/docs/wireless/controller/technotes/8-5/b_Cisco_Aironet_Sensor_Deployment_Guide.html, Feb. 2018, 32 pages.

* cited by examiner

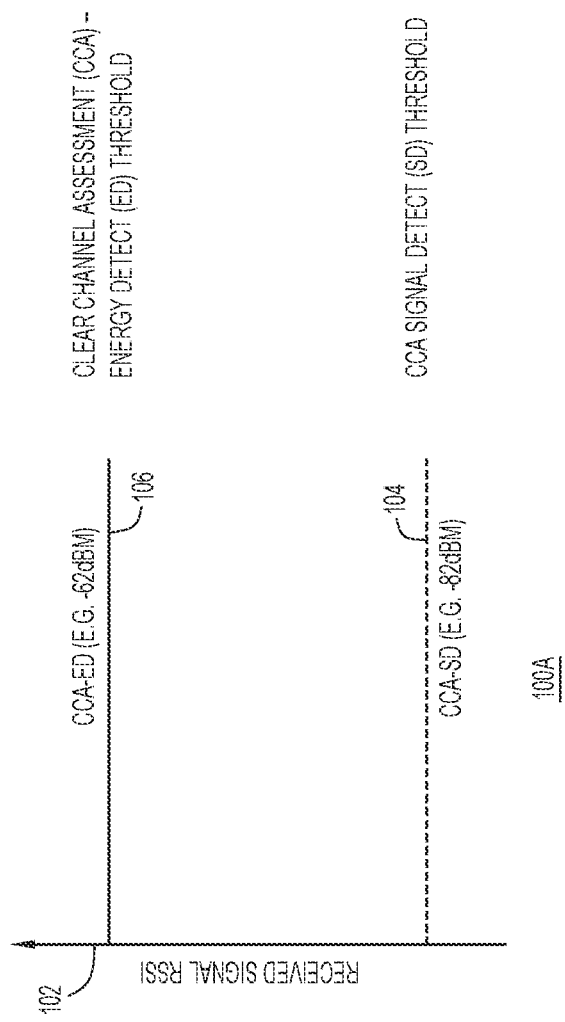

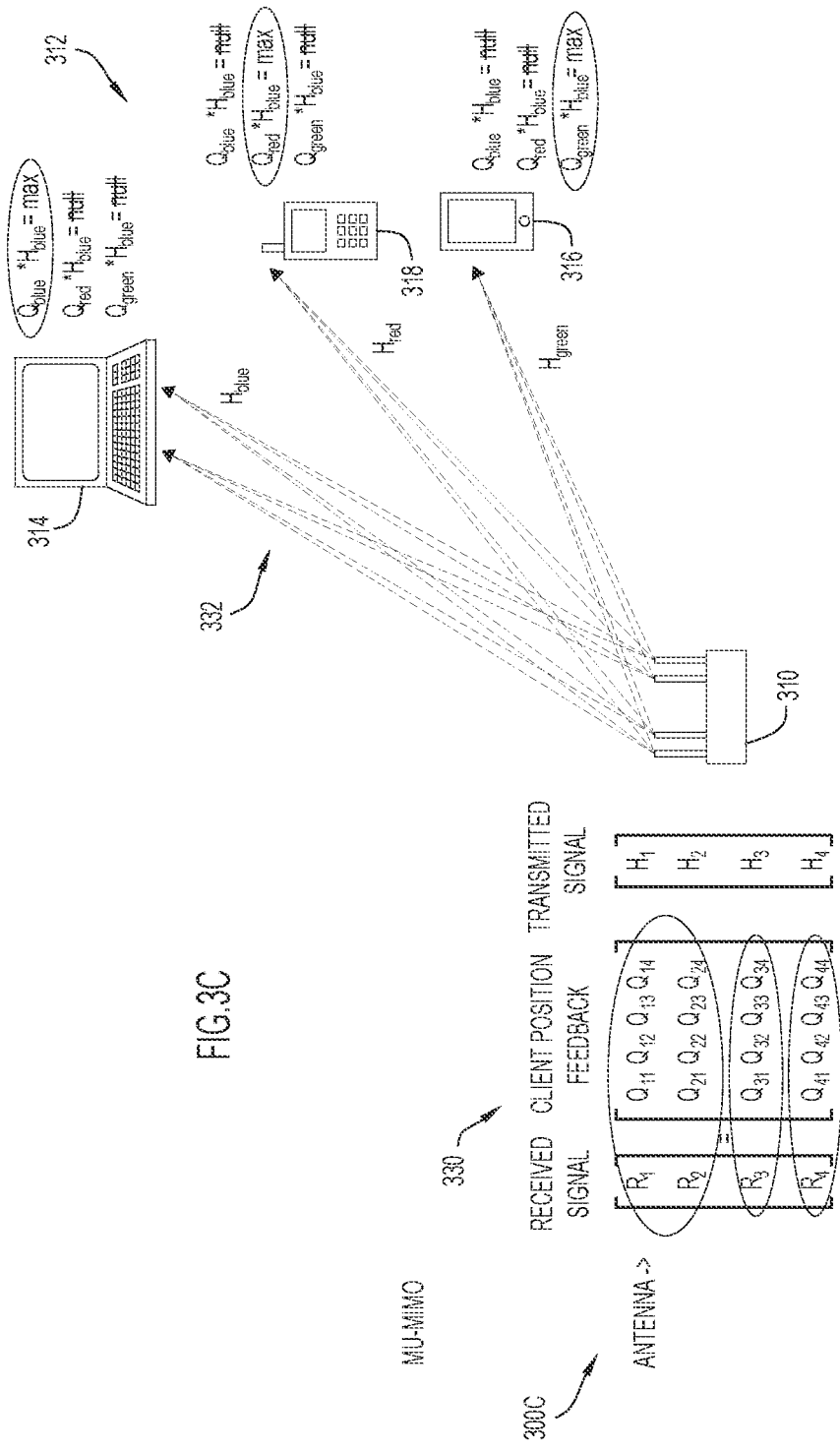

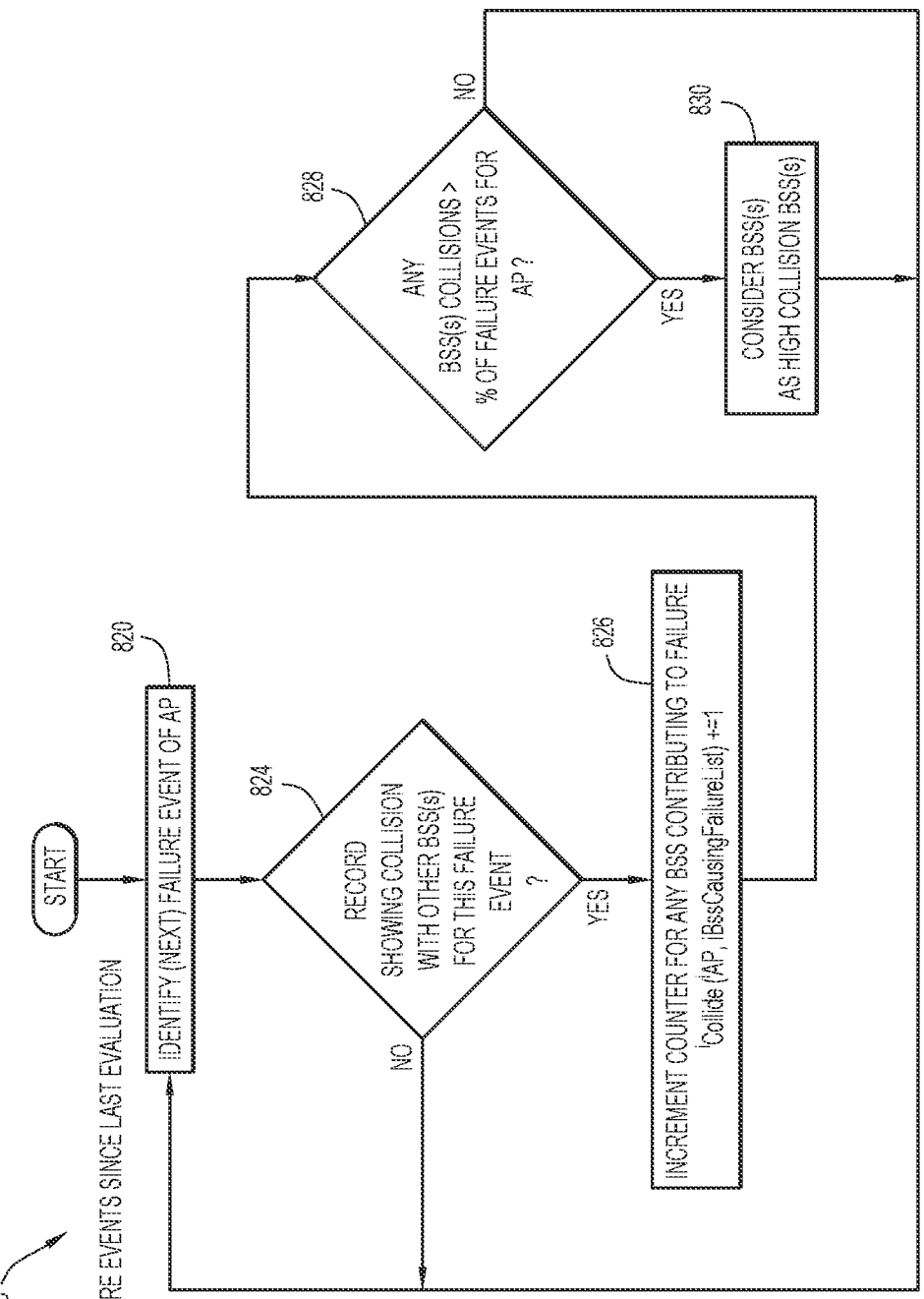

SPATIAL REUSE (SR) OPTIMIZATION IN WIRELESS NETWORKS USING SENSOR NODES AND ACTUAL PACKET COLLISION MEASUREMENTS

TECHNICAL FIELD

The present disclosure relates generally to techniques for spatial reuse (SR) in wireless networks, such as IEEE 802.11ax based networks, and more particularly to SR optimizations in wireless networks with use of sensor nodes and actual packet collision measurements.

BACKGROUND

IEEE 802.11ax has defined better capabilities to effectively manage interference in managed networks such as those deployed by enterprises and service providers. Spatial reuse (SR) is a feature in IEEE 802.11ax that provides an increased per access point (AP) capacity by allowing less back-off from transmissions in the face of co-channel Clear Channel Assessment (CCA) events. However, finding the right balance between making it easier for devices to get on the radio frequency (RF) medium and limiting inter-cell interference is very challenging.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 1A is a graph for illustrating traditional clear channel assessment (CCA) thresholds for use in IEEE 802.11 radio communications;

FIGS. 3B and 3C are illustrative representations of an AP and client devices operating according to general multi-user (MU) MIMO (MU-MIMO);

FIGS. 8A and 8B form a flowchart for describing a method for use in SR optimization in a WLAN with use of an 802.11 multi-user receiver procedure for blind detection and demodulation of colliding packets according to some implementations of the present disclosure;

DESCRIPTION OF EXAMPLE EMBODIMENTS

Figure 1B:
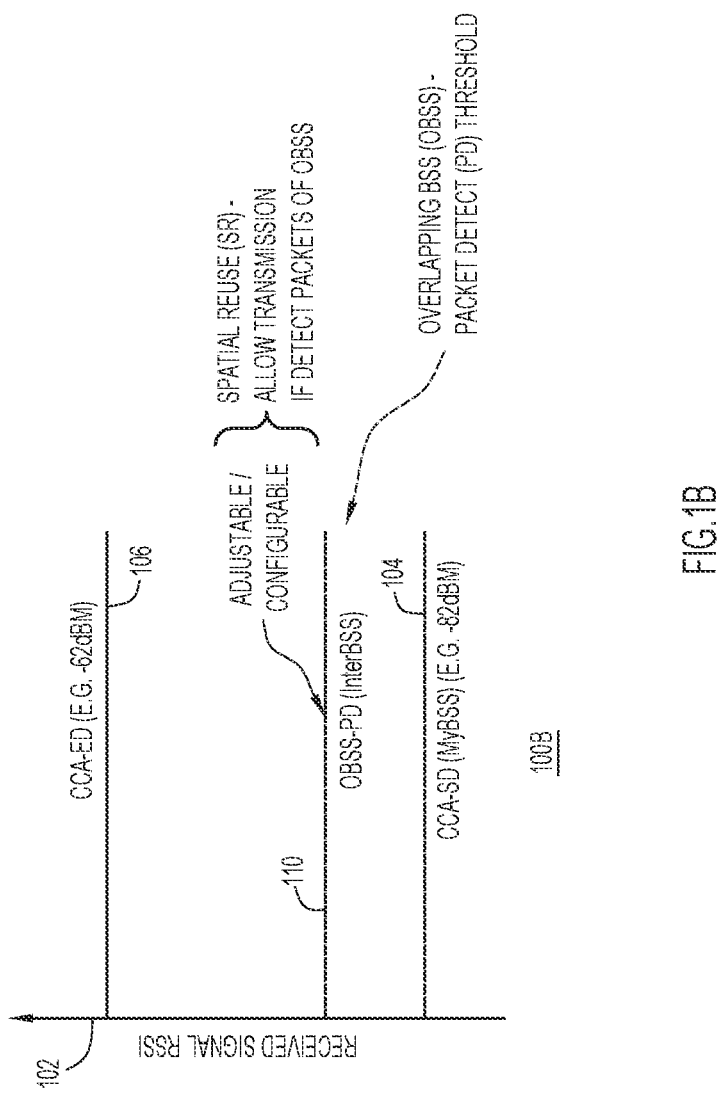
FIG. 1B is a graph for illustrating the traditional CCA thresholds as well as an overlapping base service set (OBSS) packet detect (PD) (OBSS-PD) threshold for use in IEEE 802.11ax radio communications.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques for spatial reuse (SR) optimization in wireless networks, such as IEEE 802.11ax based networks, with use of sensor nodes and/or actual packet collision measurements are described herein.

In one illustrative example, a device configured for use in a wireless local area network (WLAN) may cause SR adjustments to be performed in the WLAN based on data received from a multi-user receiver procedure for the blind detection and demodulation of colliding packets from multiple stations.

The multi-user receiver procedure may be performed by an access point (AP) and/or one or more sensor nodes distributed across the WLAN, each having a multi-user receiver configured for blind detection and demodulation of colliding packets.

In some implementations, the multi-user receiver procedure may involve receiving and decoding, over a channel, a first spatial stream from a first device associated with a first base service set (BSS) color; simultaneously receiving and decoding, over the channel, a second spatial stream from a second device associated with a second BSS color (i.e. an overlapping BSS or "OBSS"); and calculating a signal-to-interference ratio (SIR) based on the signal levels associated with the first and the second spatial streams. An SR adjustment may be performed based on an identification that the SIR is outside a limit set by a threshold value. The SR adjustment may involve adjusting an OBSS-Packet Detect (OBSS-PD) threshold associated with the OBSS, adjusting an SR-TX threshold value for the OBSS to be decreased, or causing a SR group (SRG) with the OBSS to be created.

More detailed and alternative techniques and implementations are provided herein as described below.

Example Embodiments

IEEE 802.11 is based on half-duplex technology for radio frequency (RF) communications. With such technology, only one radio can transmit on a frequency channel at any given time. In wireless systems, sharing the same RF channel in the same physical space has always been a challenge.

Although 802.11 may provide a more robust and polite performance than the alternatives, access points (APs) and client devices (e.g. stations or "STAs") of a wireless local area network (WLAN) (or Wi-Fi network) still generally operate somewhat independently to maximize performance. Here, some client devices may use too much power given the proximity to their associated AP, creating unnecessary interference. On the other hand, some client devices may use too little power given the interference and therefore are unable reach their associated AP. The signal level at which a client device may detect whether a channel is "free to transmit" has historically been conservative based on minimal performance expectations and, in actual practice, supplemented by individual vendors for improving performance.

Giving more detail, 802.11 based networks make use of techniques for carrier-sense multiple access with collision avoidance (CSMA/CA). CSMA/CA is a network multiple access method in which client devices perform carrier sensing in attempt to avoid collisions, starting transmission only after a channel is sensed or detected to be "idle." Simply put, CSMA/CA is a line of defense to ensure that a client device does not transmit while another client device is already transmitting on the same channel.

Physical carrier sense of an RF channel is performed regularly by client devices that are not transmitting or receiving. When a client device performs a physical carrier sense, it is listening to the channel to see whether any RF transmissions from other client devices are occupying the channel. Physical carrier sense may be used to determine whether a frame transmission is in-bound for a client device to receive. Here, if RF is detected over an RF medium, the client device will attempt to synchronize with the transmission. Physical carrier sense may also be used to determine whether the RF medium is busy before transmitting. Here, if the RF medium is "clear," the client device is permitted to transmit.

In order to accomplish the above, client devices make use of what is referred to as a clear channel assessment (CCA) to appraise the RF medium. CCA involves listening for RF transmissions at the physical layer. Traditional 802.11 radios may use two separate CCA thresholds when listening to the RF medium. These CCA thresholds include a signal detect (SD) threshold (or CCA-SD threshold) and an energy detect (ED) threshold (or CCA-ED threshold).

The CCA-SD threshold may be used in association with the detection of an 802.11 preamble transmission from another transmitting 802.11 client device. The preamble is a component of a physical layer header of 802.11 frame transmissions used for synchronization between transmitting and receiving 802.11 radios. Client devices are expected to detect packets and, if present, defer to them if received above the CCA-SD threshold. In some implementations, the CCA-SD threshold may be about −82 dBm. More generally, the CCA-SD threshold is statistically around 4 dB signal-to-noise ratio (SNR), which is what most 802.11 radios need to detect and decode the preamble. In other words, an 802.11 radio can usually decode any incoming 802.11 preamble transmission at a received signal strength of about 4 dB above the noise floor. The CCA-SD threshold may alternatively be referred to as a packet detect (PD) threshold (or CCA-PD threshold) or a preamble carrier sense threshold.

On the other hand, the CCA-ED threshold may be used in association with the detection of any other type of RF transmission during the CCA. Note that the 2.4 GHz and 5 GHz bands are license-free bands, and therefore other non-IEEE 802.11 RF transmissions may occupy a channel. Client devices are expected to listen to the RF medium before transmission and defer to any received energy above the CCA-ED threshold. In some implementations, the CCA-ED threshold may be about −62 dBm. More generally, the CCA-ED threshold is 20 dB higher than the signal detect threshold. If the noise floor of channel 36 were at −95 dBm, the CCA-SD threshold for detecting 802.11 transmissions would be around −91 dBm, and therefore the CCA-ED threshold for detecting other RF transmissions would be −71 dBm. If the noise floor of channel 40 were at −100 dBm, the SD threshold for detecting 802.11 transmissions would be around −96 dBm, and the ED threshold for detecting other RF transmissions would be −76 dBm.

FIG. 1A is a graph 100A for illustrating the traditional CCA thresholds for use in IEEE 802.11 radio communications. An axis 102 for signal strength (or a received signal strength indication or "RSSI") is associated with the signal strength as received by a client device (e.g. client device 204 of FIG. 2 described below). As explained above, a CCA-SD threshold 104 may be used in association with the detection of an 802.11 preamble transmission from another transmitting 802.11 client device. Client devices are expected to detect packets and, if present, defer to them if received above the CCA-SD threshold 104. In some implementations, the CCA-SD threshold 104 may be about −82 dBm. On the other hand, a CCA-ED threshold 106 may be used in association with the detection of any other type of RF transmission during the CCA. Client devices are expected to listen to the RF medium before transmission and defer to any received energy above the CCA-ED threshold 106. In some implementations, the CCA-ED threshold 106 may be about −62 dBm.

IEEE 802.11ax has defined better capabilities to effectively manage interference in managed networks (e.g. WLANs) such as those deployed by enterprises and service providers.

To better explain, a basic service set (BSS) may be said to define the basic topology of an 802.11 network. The communicating devices that make up a BSS include an AP and one or more client devices in communication therewith. In IEEE 802.11ax, a BSS "color" is a numerical identifier (i.e. six bits in the signal preamble or "SIG") which may be used to differentiate between BSSs. If the BSS color is identified to be the same, then the client device may identify the frame transmission as an "intra-BSS" frame transmission from its own BSS (i.e. from its own AP). If the BSS color is identified to be different from its own BSS color, then the client device may identify the frame transmission as an "inter-BSS" frame from an overlapping BSS (OBSS) (i.e. from a different AP).

Figure 2:
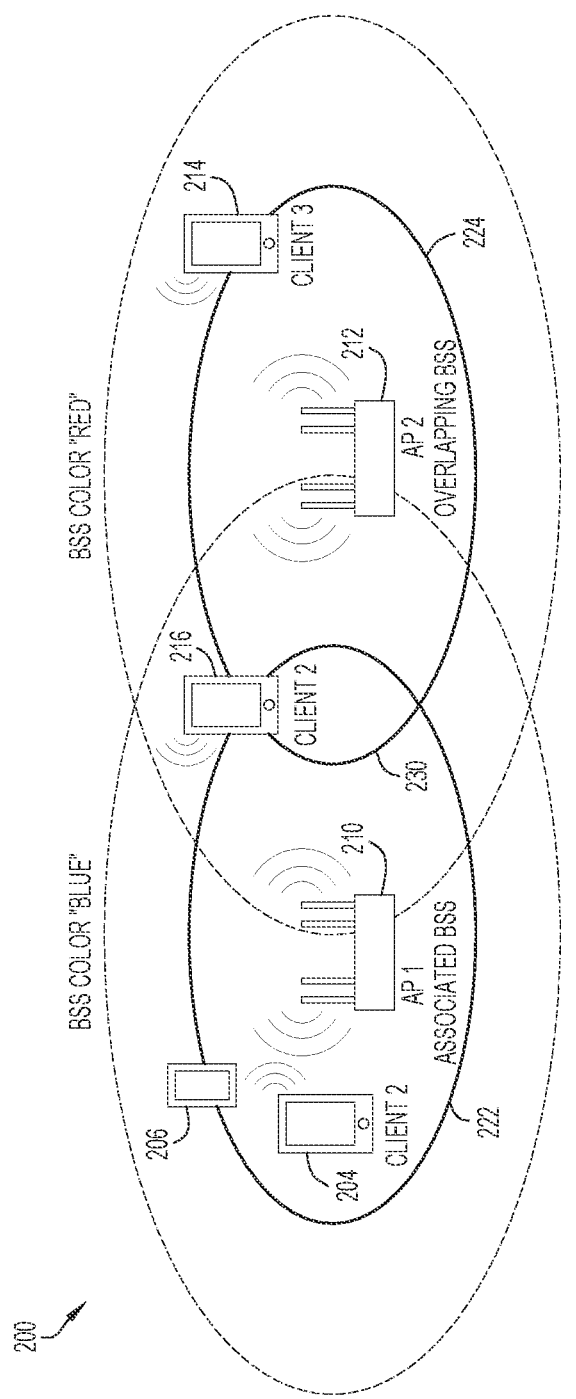
FIG. 2 is an illustrative representation of a simplified node arrangement of a wireless local area network (WLAN) which includes an access point (AP) of a base service set (BSS) and an AP of an OBSS.

To illustrate, FIG. 2 is an illustrative representation of a simplified node arrangement 200 of a wireless local area network (WLAN) which includes an AP 210 and an AP 212. AP 210 may provide for radio communication in a communication radius 222. Client devices 204 and 206 may be located within communication radius 222 and be associated with AP 210. AP 210 and associated client devices 204 and 206 may be assigned a BSS color of "Blue." On the other hand, AP 212 may provide for radio communication in a communication radius 224. Client devices 214 and 216 may be located within communication radius 224 and be associated with AP 212. AP 212 and associated client devices 214 and 216 may be assigned a BSS color of "Red."

Assume that client devices 204, 206, 214, and 216 operate on the same channel for radio communications. Client device 216 which is associated with AP 212 may be located in an overlapping communication radius 230, where communication radius 224 overlaps with communication radius 222. From the perspective of AP 210 and client device 204, detected frame transmissions from client device 206 would be characterized as intra-BSS frames of its own BSS. On the other hand, detected frame transmissions from client device 216 would be characterized as inter-BSS frames of an OBSS.

With IEEE 802.11ax, Spatial Reuse (SR) may be achieved by allowing a client device to disregard detected transmissions from an OBSS so that it may transmit at the same time. For example, a client device may learn its own BSS upon association with an AP and regard other BSSs as OBSSs. Here, the client device makes use of a relatively low signal level threshold for deferral of packets when detecting signals with the same BSS color, in order to reduce collisions in the same BSS. On the other hand, the client device makes use of a relatively high signal level threshold for deferral of packets when detecting signals with a different BSS (i.e. OBSS), in order to allow the client device to perform simultaneous transmissions for SR. Fundamentally, this scheme trades off some degree of ubiquitous fairness for a higher per-AP capacity.

With reference now to FIG. 1B, what is shown is a graph 100B for illustrating the CCA thresholds as well as an OBSS-Packet Detection (PD) (OBSS-PD) threshold 110 for use in IEEE 802.11ax radio communications. BSS color information may be used in modes of SR operation to apply the OBSS-PD threshold 110 for detected inter-OBSS frame transmissions. OBSS-PD threshold 110 is an adjustable or configurable threshold. Thus, APs and client devices may agree upon the required packet-detection or "busy signal" thresholds and/or transmit power levels for improved SR. Here, the AP may announce a threshold (i.e. the OBSS-PD threshold 110) that is set between the CCA-SD and the CCA-ED thresholds 104 and 106. If a packet is detected to be from a client device's own BSS ("MyBSS"), then the device may defer to this packet if the signal level is above the conventional CCA-SD threshold (e.g. −82 dBM). If the packet is detected to be from another BSS ("InterBSS"), however, then the client device is permitted to transmit unless the signal level is greater than the less strict, OBSS-PD threshold 110. The packets detected may include Physical Layer Convergence Procedure (PLCP) Protocol Data Units (PDUs) (PPDUs).

Figure 3A:
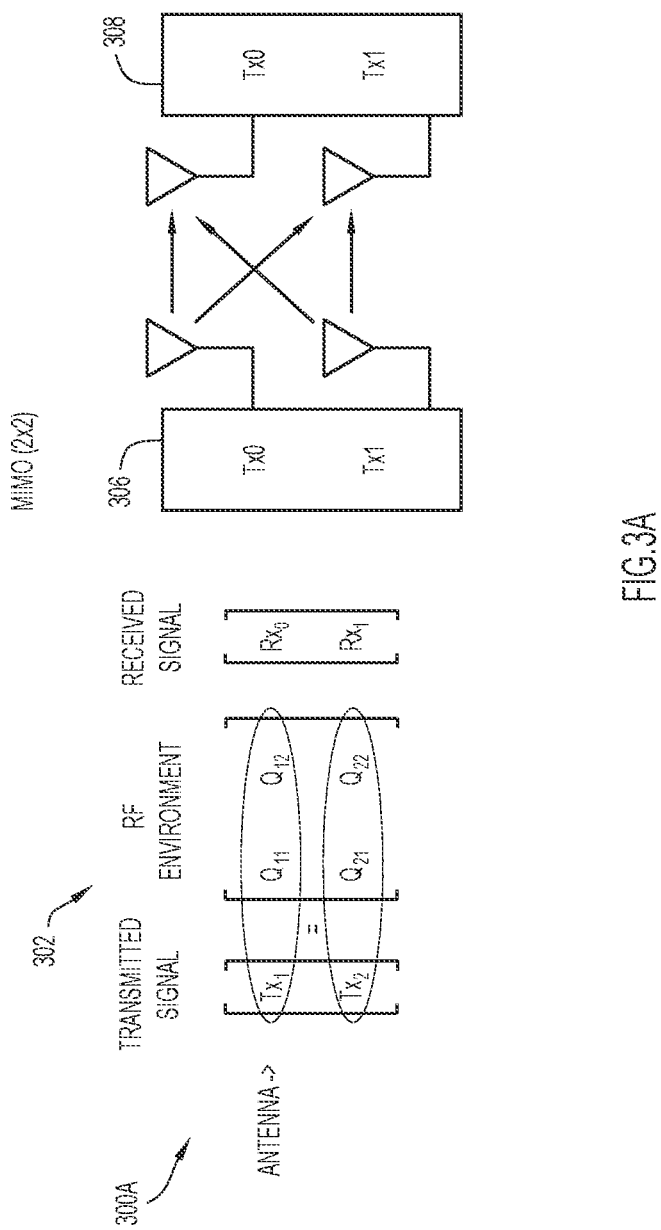
FIG. 3A is an illustrative representation of a transmitting device and a receiving device operating according to general multiple-input multiple output (MIMO)

IEEE 802.11ax/ac also allows for use of multi-user (MU)—multiple-input multiple-output (MIMO) (MU-MIMO), which was introduced earlier in 802.11ac. Even earlier in 802.11n, single-user MIMO was introduced in order to enhance Wi-Fi throughput. With MIMO, an AP and a client device may each use a set of radio-antenna chains that are physically separated from each other by at least ½ wavelength, so as to be spatially decorrelated from each other. To better explain with reference to an illustrative diagram 300A of FIG. 3A, a transmitting device 306 configured with MIMO may send a spatial stream from its set of radio-antenna chains for receipt and mathematical reconstruction by an identical set of radio-antenna chains of the receiving device 308 configured with MIMO. The receiving device may use signal-processing techniques 302 to mathematically reconstruct the original spatial streams.

Figure 3B:
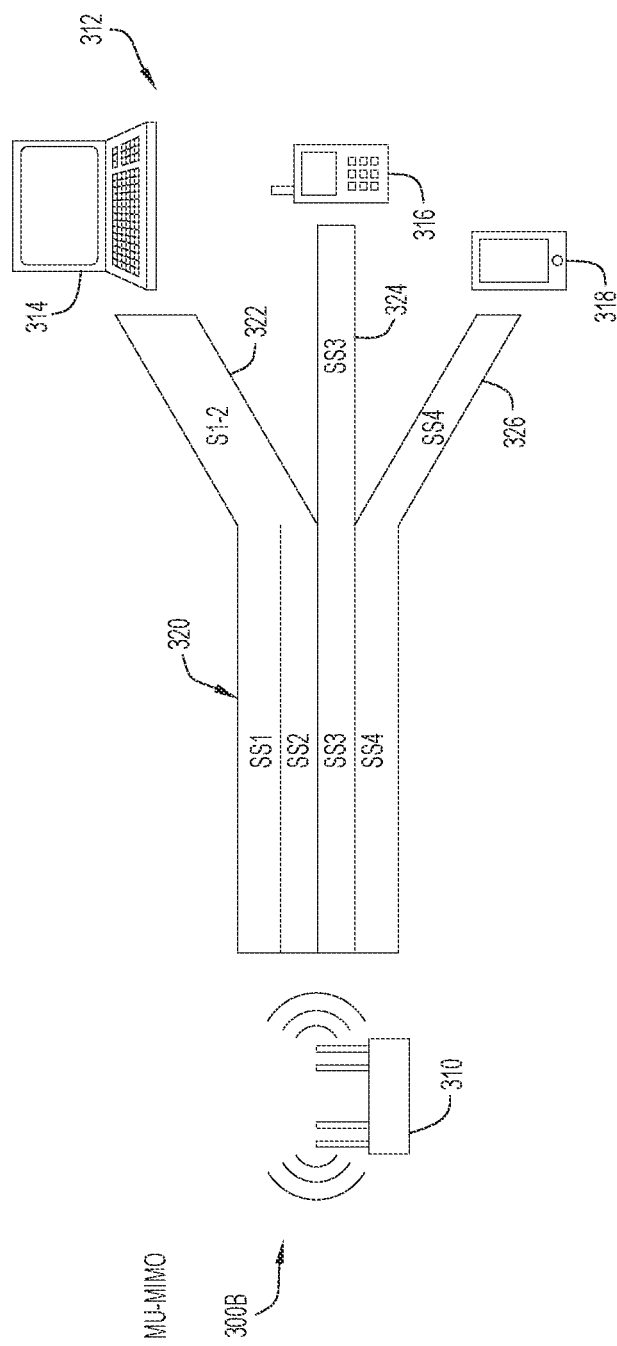

General MU-MIMO may improve spatial reuse in WLANs, since an AP may send separate, independent transmissions within its own coverage area. To better illustrate with reference to an illustrative diagram 300B of FIG. 3B, an AP 310 configured with general MU-MIMO may transmit a plurality of spatial streams 320 (e.g. four) simultaneously but separately to a plurality of client devices 312 (e.g. three). As shown, client devices 312 include a client device 314 which is a laptop computer, a client device 316 which is a smartphone, and a client device 318 which is a tablet. Two of the spatial streams 322 are transmitted to the laptop which is configured to support high-speed data transmission. Spatial stream 324 is transmitted to the smartphone which is a single-steam device, and spatial stream 326 is transmitted to the table which is also a single-stream device. To keep these three transmissions separate, AP 310 makes use of beamforming to focus each of the transmissions toward its respective client device.

With reference now to an illustrative diagram 300C of FIG. 3C, general MU-MIMO may make use of beamforming techniques with the addition of additional radio-antenna chains, for control of the per-subcarrier spatial mapping in order to control both the areas of maximum constructive interference (i.e. where the signal is the strongest) and maximum destructive interference (i.e. where the signal is the weakest). Given a sufficient number of antennas and knowledge about the over-the-air multipath channels of all associated client devices 312, MU-MIMO makes use of signal processing techniques 330 to create a steering matrix to transmit to multiple client devices 312 both independently and simultaneously. A process for general MU-MIMO may be as follows, again with reference to FIG. 3C. AP 310 having a MU-MIMO transceiver may broadcast a sounding frame. In response, each MU-MIMO-compatible client device 314, 316, and 318 may transmit to AP 310 matrix data associated with client position. AP 310 then may compute the relative position of each client device 314, 316, and 318. Next, the AP 310 may select a group of client devices 312 for simultaneous communication. The AP 310 may compute the necessary phase offsets for each data stream to each client device 314, 316, and 318 in the group and transmit all of the data streams in the group. The AP 310 may then send a request (e.g. a BlockAckRequest) to each client device 314, 316, and 318 in the group separately to get confirmation as to whether the device received the data. The AP 310 may receive an acknowledgement (e.g. a BlockAck) from each client device 314, 316, and 318 in the group that successfully received data.

According to the present disclosure, spatial reuse adjustments in a WLAN may be made based on data received from one or more devices, each of which include an 802.11 multi-user receiver configured for the "blind" detection and demodulation of colliding packets from multiple stations, rather than (solely) based on data received from general MU-MIMO communications. Such 802.11 multi-user receiver technology for the blind detection and demodulation of colliding packets (colliding OFDM signals) from multiple stations is described in U.S. Pat. No. 9,866,416 B2 entitled "System and Methods for Simultaneous Communication with Multiple Wireless Communication Devices, and U.S. Pat. No. 9,467,986 B2 having the same title, each of which is incorporated by reference herein in its entirety. The receiver technology need not rely upon a-priori channel state information. It is understood that variations of the above-referenced 802.11 multi-user receiver technology may be also be realized and applied in the same or similar manner as that described herein below.

Note that prevalent implementations of 802.11 utilize OFDM in which many symbols are transmitted simultaneously with each simultaneously transmitted symbol utilizing a different frequency. The individual frequencies used to transmit the different symbols are referred to as subcarriers. OFDM generally relies on the average signal to interference plus noise ratio (SINR) at the individual subcarriers to be sufficient to permit proper channel estimation and subsequent demodulation. In the case where multiple 802.11 transmissions occur simultaneously and with no prior knowledge of the channel to resolve the transmissions, information from multiple sources contributes to the subcarrier. Given that 802.11 has no inherent mechanism for resolving the information on a subcarrier when the information arises from multiple sources, the information from all sources is generally lost. Many of the problems and limitations of WLAN in environments with a high density of client devices stems from the inability to receive multiple WLAN signals simultaneously.

In some implementations of the systems and methods for the simultaneous communication with multiple wireless communication devices, what is described involves receiving, using a plurality of antennas at a first wireless station, a plurality of packets, comprised of OFDM wireless signals, transmitted simultaneously from a plurality of other wireless stations wherein each of the simultaneously transmitted packets includes a plurality of frequency tones, frequency domain transform the received packets, grouping frequency domain transform outputs for each subcarrier, determining a difference between subcarrier groups formed over different sample sets, and determining a set of weights for each subcarrier, wherein the weights are selected such that the first wireless station can at least one of detect or demodulate the received plurality of packets.

In some other implementations of the systems and methods for the simultaneous communication with multiple wireless communication devices, individual 802.11 OFDM transmissions may be demodulated when multiple 802.11 OFDM transmissions occur simultaneously. Each of the OFDM tones observed across multiple receive antennas can be envisioned as a subcarrier vector. The cumulative subcarrier vector may consist of the sum of individual subcarrier vectors with each individual subcarrier vector associated with an individual source. Although there is no inherent mechanism within 802.11 permitting the individual subcarrier vectors to be directly determined when multiple 802.11 transmissions occur simultaneously, at least some implementations may utilize the fact that the individual subcarrier vectors for an 802.11 source will remain constant under specific conditions whereas other subcarrier vectors will generally change. By subtracting different cumulative subcarrier vectors and therefore eliminating the vector component associated with an 802.11 signal of interest having a constant subcarrier vector, at least some implementations may be able to build a vector subspace consisting of interfering subcarrier vectors only. By further finding a weighting vector orthogonal to the subspace of interfering subcarrier vectors and applying the weighting vector to the cumulative subcarrier vector, at least some implementations may be able to extract and demodulate an individual 802.11 transmission in the presence of the interference sources. The ability to resolve multiple interfering 802.11 signals leads directly to further benefits, including the enablement of uplink (UL) MU-MIMO, efficient downlink (DL) MU-MIMO, and overall interference reduction providing significantly increased system capacity.

Note that, in an 802.11 environment, a client device responds to RF conditions that it perceives, so it is desirable that the infrastructure has an accurate view as seen by the client device in order to deliver the best Quality of Experience (QoE). In fact, the more historical or analytical data the WLAN can learn about its client devices the better, especially given the diversity of devices in the ecosystem. In addition, because APs of a WLAN cooperate in a group to provide contiguous service, it is desirable that its Radio-Resource-Management (RRM) function provide the right conditions (e.g. at the cell edge) for client devices in obtaining optimal CCA thresholds for both the BSS and one or more other BSSs (i.e. an OBSS). In other words, the RRM function should be aware of the BSS color and OBSS-PD threshold when making RF allocation decisions. In any case, the BSS color and optimal OBSS-PD thresholds are needed to significantly improve the QoE and capacity of both enterprise and service provider networks alike, enhancing existing high-density use cases and even perhaps enabling new business models for Wi-Fi operators.

Again, with use of techniques of the present disclosure, SR adjustments may be made in a WLAN for optimizing radio communications based on 802.11 multi-user receiver technology for the blind detection and demodulation of colliding packets (colliding OFDM signals) from multiple stations. The receiver technology need not rely upon a-priori channel state information. An SR adjustment may involve a determination of one or more suitable OBSS-PD/SR-CCA thresholds (e.g. the OBSS-PD threshold), one or more suitable SR-TX power levels, and/or whether an SR group (SRG) should be formed with an interfering OBSS (e.g. where two BSSs are treated as a single BSS or combined group to avoid poor performance). Note that such a determination is a sensitive optimization task, where an inappropriate value may have a significant adverse impact on WLAN performance. SR statistics, when obtained solely from measurements at the AP, may be heavily imbalanced at least in some situations.

Figure 4:
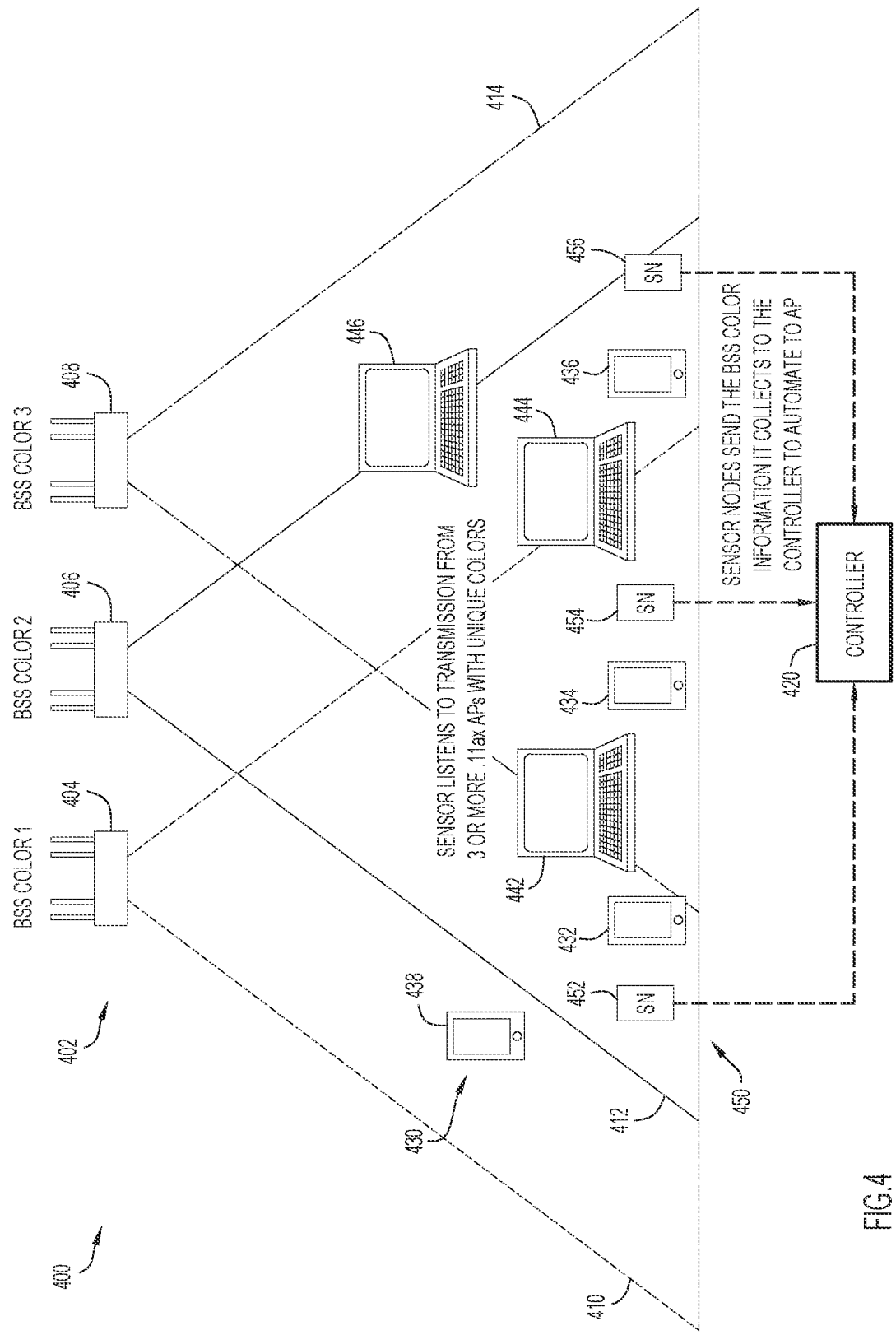
FIG. 4 is an illustrative representation of an example node arrangement of nodes in a WLAN for use in describing SR optimization techniques according to the present disclosure, where the nodes include one or more APs and/or sensor nodes each having an 802.11 multi-user receiver configured for blind detection and demodulation of colliding packets from multiple stations.

Accordingly, FIG. 4 is an illustrative representation of an example node arrangement 400 of a WLAN for use in describing SR optimization techniques according to some implementations of the present disclosure.

As illustrated, node arrangement 400 of FIG. 4 may include a plurality of APs 402 of the WLAN and a plurality of client devices 430 or STAs configured to operate for communications in the WLAN via the APs 402. In FIG. 4, the plurality of APs 402 include APs 404, 406, and 408, and the plurality of client devices 430 include client devices 432, 434, 436, and 438 (e.g. smartphones or tablets) as well as client devices 442, 444, and 446 (e.g. laptop computers). Each one of APs 404, 406 and 408 may provide for a different RF coverage area 410, 412, and 414, respectively. In addition, each one of APs 404, 406, and 408 may be associated with a different BSS color.

Notably, the APs 404, 406, and 408 may be in communication with a plurality of sensor nodes 450. In FIG. 4, the plurality of sensor nodes 450 may include sensor nodes 452, 454, and 456. Sensor nodes 452, 454, and 456 may be (e.g. evenly) distributed across the WLAN and mounted in a fixed position. The APs 402 and/or sensor nodes 450 may also be in communication with a controller 420. Here, controller 420 may be configured to control and/or instruct any SR adjustments to be performed in the WLAN. In addition or as an alternative, any one of APs 402 may be configured to control and/or instruct any SR adjustments in the WLAN to be performed. The APs 402, sensor nodes 450, and/or controller 420 may be configured to operate further as described herein.

Different scenarios of radio communications between APs and devices of the wireless network of FIG. 4 are shown with more simplicity in the illustrative diagrams of FIGS.

5A, 5B, and 5C. In a scenario 500A in FIG. 5A, client device 432 is associated with AP 404 of the first BSS having the first BSS color, and client device 434 is associated with AP 406 of the second BSS having the second BSS color. Each one of client devices 432 and 434 may be transmitting on the same channel (e.g. channel 35) and in relatively close proximity.

Figure 5A:
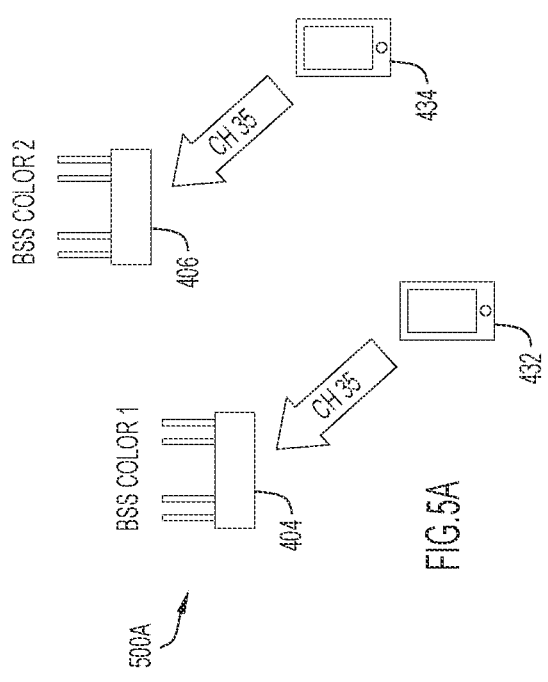
FIGS. 5A-5C are illustrative representations of example communication scenarios in the network node arrangement of FIG. 4.
Figure 5C:
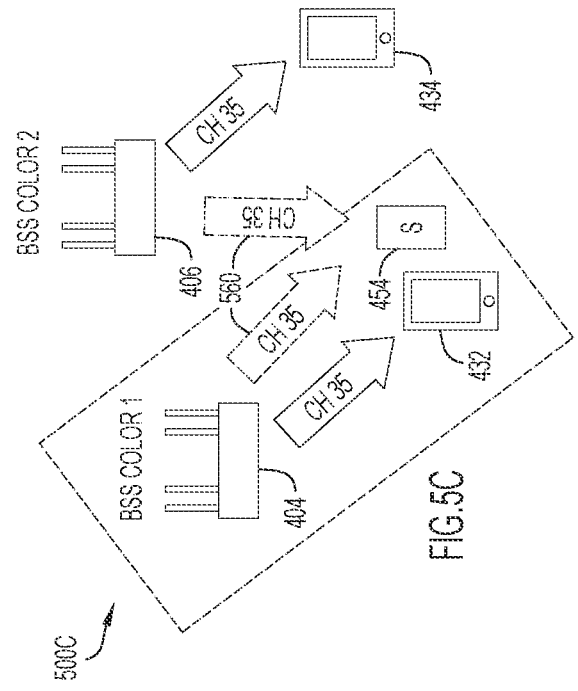
Figure 5B:
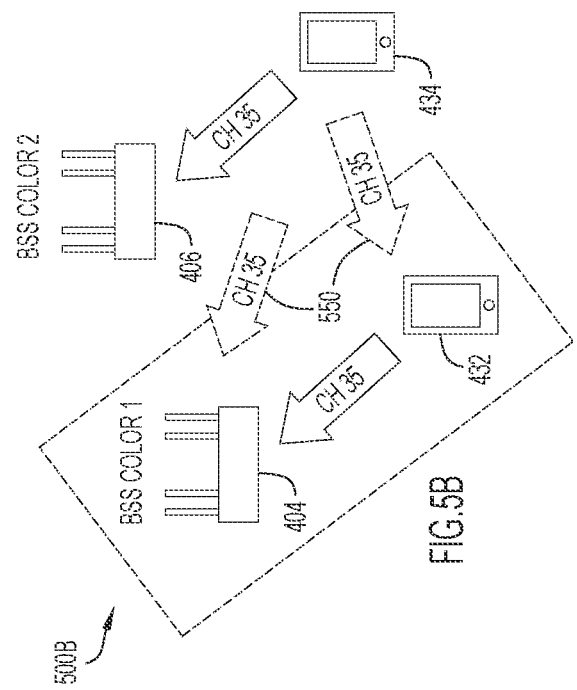

As a result, as indicated in a continued scenario 500B of FIG. 5B, co-channel interference 550 from the transmission of client device 434 may be undesirably received at client device 432 and/or the AP 404. In some implementations of the present disclosure, AP 404 having a wireless transceiver which includes an 802.11 multi-user receiver configured for blind detection and demodulation of colliding packets in FIG. 5B, may simultaneously receive and decode streams from both client device 432 (the desired stream) and client device 434 (the interference stream) indicative of actual packet collisions, and calculate the interference level associated with the actual packet collisions, for use in determining an SR adjustment.

In an alternative scenario 500C of FIG. 5C, it is shown that transmissions from APs 404 and 406 to client devices 432 and 434, respectively, may result in transmissions 560 which may be "sniffed" or detected at sensor node 454. In some implementations of the present disclosure, sensor node 454 having a wireless transceiver which includes the 802.11 multi-user receiver configured for blind detection and demodulation of colliding packets in FIG. 5C, may simultaneously receive and decode streams from both AP 404 (the desired stream) and AP 406 (the interference stream) indicative of actual packet collisions, and calculate the interference level associated with the actual packet collisions, for use in determining an SR adjustment.

With reference back to FIG. 4 as well as FIGS. 5A-5C, data from exchanges with at least some of the sensor nodes 450 which are geographically-distributed across the WLAN may be used to assist in the determination of an SR adjustment. Here, each 802.11 multi-user receiver configured for blind detection and demodulation of colliding packets may be used to decode and identify actual packet collisions (e.g. PPDU collisions) across the OBSS and what devices they are to/from at an AP. Accordingly, the 802.11 multi-user receiver may be configured to operate to (e.g. fully) decode actual packet collisions and directly calculate the interference level associated with actual colliding packets, as seen at the receiver. Such a technique is advantageous over any technique that may infer collisions from sparse frames received.

In some implementations, each one of sensor nodes 450 may be configured to be mounted in fixed position in the WLAN. In some implementations, each one of sensor nodes 450 may be an AP configured to operate as a sensor, and/or operate as a client device or STA in the WLAN. In some implementations, each one of sensor nodes 450 may be operate according to and/or compatible with IEEE 802.11ax. In some preferred implementations, each one of sensor nodes 450 may be of a similar make and construction as a Cisco Aironet® 1800s wireless network sensor, implemented with an 802.11 multi-user receiver configured for blind detection and demodulation of colliding packets, as well as to "see" the wireless network environment from the perspective of a client. Aironet® is a registered trademark of Cisco Systems, Inc. of San Jose, Calif.

In some implementations, each one of the APs 402 and sensor nodes 450 in the WLAN may have an 802.11 multi-user receiver configured for blind detection and demodulation of colliding packets, to operate to simultaneous capture both the desired stream (i.e. of the BSS) and the interference stream (i.e. of another BSS or OBSS), even though they collide in time, for use in determining an SR adjustment. The sensor nodes 450 that are provided in various locations across the WLAN may obtain and report measurements from the perspective of the client devices. In some implementations, the APs 402 and the sensor nodes 450 may both operate according to and/or compatible with IEEE 802.11ax.

With the interference level and signal level for the BSS measured, the OBSS PD/SR-CCA may be adjusted to avoid interference levels (e.g. signal-to-interference ratio or "SIR" levels) that are too low for the BSS, or alternatively, a SR-TX power level may be reduced on the transmission side. If it is determined that the system needs to further increase OBSS PD/SR-CCA and/or backoff the SR-TX power level beyond a further threshold for achieving a minimum SIR, an SRG may be formed with the interfering OBSS.

In some implementations, measurements of SR statistics on the client-side may be obtained through use of one or more sensor nodes 450 for optimization. The SR statistics may include a number of SR transmissions, a number of success rates of the SR transmissions, signal strength levels from neighboring BSS transmissions, and others. Advantageously, the presence of active sensor nodes 450 that are configured to "sniff" the RF medium and report those statistics may be very beneficial.

Thus, in some implementations, determinations may be made by leveraging feedback from sensor nodes 450 that are distributed across the WLAN as well as metrics from the AP(s) 402. Intermittent exchanges may be scheduled with these sensor nodes 450 in between co-channel APs in order to identify the impact of coincident transmissions to/from these sensors to the APs. Note that when RRM algorithms assign channels, two co-channel APs are likely to have a few non-co-channel APs or sensor nodes in between them where such measurements can be performed, better representing client-side information exchanges.

When monitoring or "sniffing" a channel, a sensor node may be informed about the BSS colors used by each of the co-channel APs and may record various data associated with each transmission. The data may include, for example, the BSS color, the RSSI, the SINR, and whether a previous transmission of the other neighboring BSS color was detected prior to the recorded transmission.

In some implementations, data are collected over a period of time and the statistics are reported for processing. In some other implementations, instead of statistical data accumulated over time, real-time per-packet information may be shared with the APs for tracking the success/failure outcomes of individual packets. These data may be shared with the BSS's (i.e. APs), a controller (e.g. a wireless controller for the WLAN), or both. The data may be aggregated and taken into account in one or more SR threshold optimization procedures.

In some implementations, a list of devices that are interfering with an AP may be created and coordinate with the OBSS to reduce Tx power for such a device, whether it is an AP or non-AP STA. Additionally or alternatively, devices involved in exchanges that resulted in retries may be identified and a map of these devices that are interfering with each other may further be created.

Figure 6:
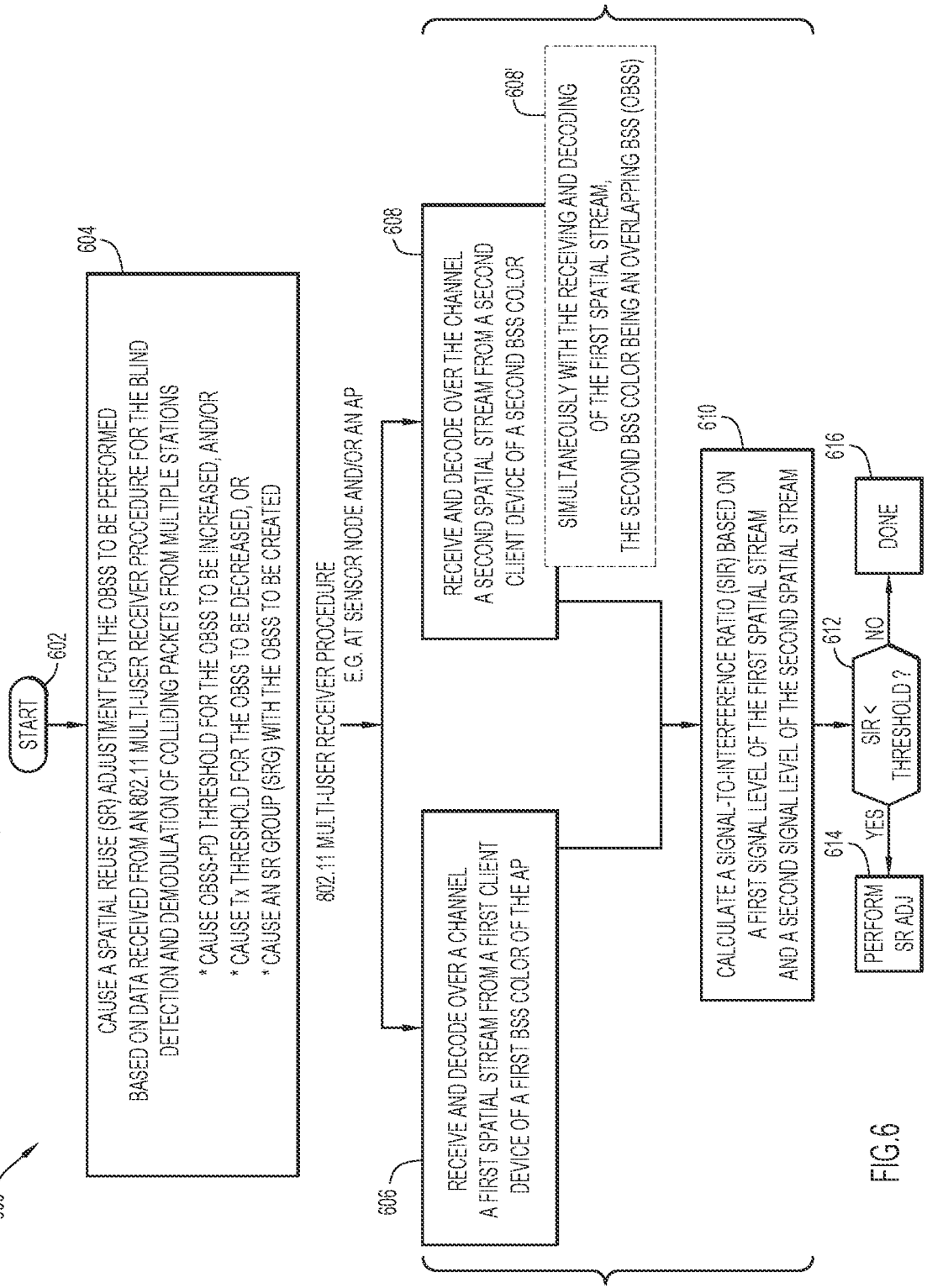
FIG. 6 is a flowchart for describing a method for use in spatial reuse (SR) optimization in a WLAN with use of an 802.11 multi-user receiver procedure for blind detection and demodulation of colliding packets according to some implementations of the present disclosure.

FIG. 6 is a flowchart 600 for describing a method for use in SR optimization in a WLAN according to some implementations of the present disclosure. The method of FIG. 6 may be performed by one or more devices configured for use in a WLAN. For example, the method may be performed by a controller or an AP, with use of one or more sensors nodes. The device may include at least one or more processors and one or more memories coupled to the one or more processors. If implemented as an AP, the AP may include an 802.11 multi-user receiver configured for blind detection and demodulation of colliding packets from multiple stations. At least part of the method may be embodied as a computer program product including a non-transitory computer readable medium and instructions stored in the computer readable medium, where the instructions are executable on one or more processors for performing the steps of the method.

Beginning at a start block 602 of FIG. 6, the device may cause an SR adjustment to be performed in the WLAN based on data received according to an 802.11 multi-user receiver procedure for blind detection and demodulation of colliding packets from multiple stations (step 604 of FIG. 6). An SR adjustment may involve an adjustment (e.g. an increase) in the OBSS-PD threshold, an adjustment (e.g. a decrease) in the SR-TX threshold, or a creation of an SRG with the OBSS.

In some implementations, the 802.11 multi-user receiver procedure itself may be performed by one or more sensor nodes, where each sensor node reports data to the controller and/or the AP. In some implementations, the 802.11 multi-user receiver procedure may be performed by the AP itself, with or without sensor nodes.

Continuing in FIG. 6, the 802.11 multi-user receiver procedure may involve receiving and decoding, over a channel, a first spatial stream from a first device associated with a first BSS color (step 606 of FIG. 6). The 802.11 multi-user receiver procedure may further involve receiving and decoding, over the (same) channel, a second spatial stream from a second device associated with a second BSS color (step 608 of FIG. 6). The receiving and the decoding of the second spatial stream in step 608 may be performed simultaneously with the receiving and the decoding of the first spatial stream in step 606 (step 608[1] of FIG. 6). The second BSS color may an OBSS. These simultaneous streams may represent actual colliding packets (e.g. colliding PPDUs) from different devices over the same channel. An SIR based on a first signal level associated with the first spatial stream and a second signal level associated with the second spatial stream may be calculated (step 610 of FIG. 6).

In some implementations of FIG. 6, if the 802.11 multi-user receiver procedure is performed at a sensor node, then the sensor node may send data associated with the packet collision to the controller and/or AP (e.g. data including the first BSS color and associated first signal level, the second BSS color and associated signal level, the SIR, etc.). Here, the controller and/or AP may identify if the SIR is outside a limit set by a threshold value (step 612 of FIG. 6) and, if so, perform the SR adjustment (step 614 of FIG. 6). Otherwise, the controller and/or AP may refrain from performing the SR adjustment (see "done" at 616 of FIG. 6).

In some other implementations of FIG. 6, if the 802.11 multi-user receiver procedure is performed at the AP, then the AP may send data associated with the packet collision to the controller. The data may include one or more data items such as the first BSS color, its associated first signal level or RSSI, and identification or address of the device; the second BSS color (i.e. OBSS), its associated signal level or RSSI, identification or address of the device; and the SIR, any indication to perform SR adjustment, etc. Here, the controller may identify if the SIR is outside a limit set by a threshold value (step 612 of FIG. 6) and, if so, cause the SR adjustment to be performed at the AP (step 614 of FIG. 6). Otherwise, the controller may refrain from causing the SR adjustment to be performed (see "done" at 616 of FIG. 6). If the controller is not involved with SR adjustments, then the AP may perform all of the steps shown in FIG. 6.

Figure 7:
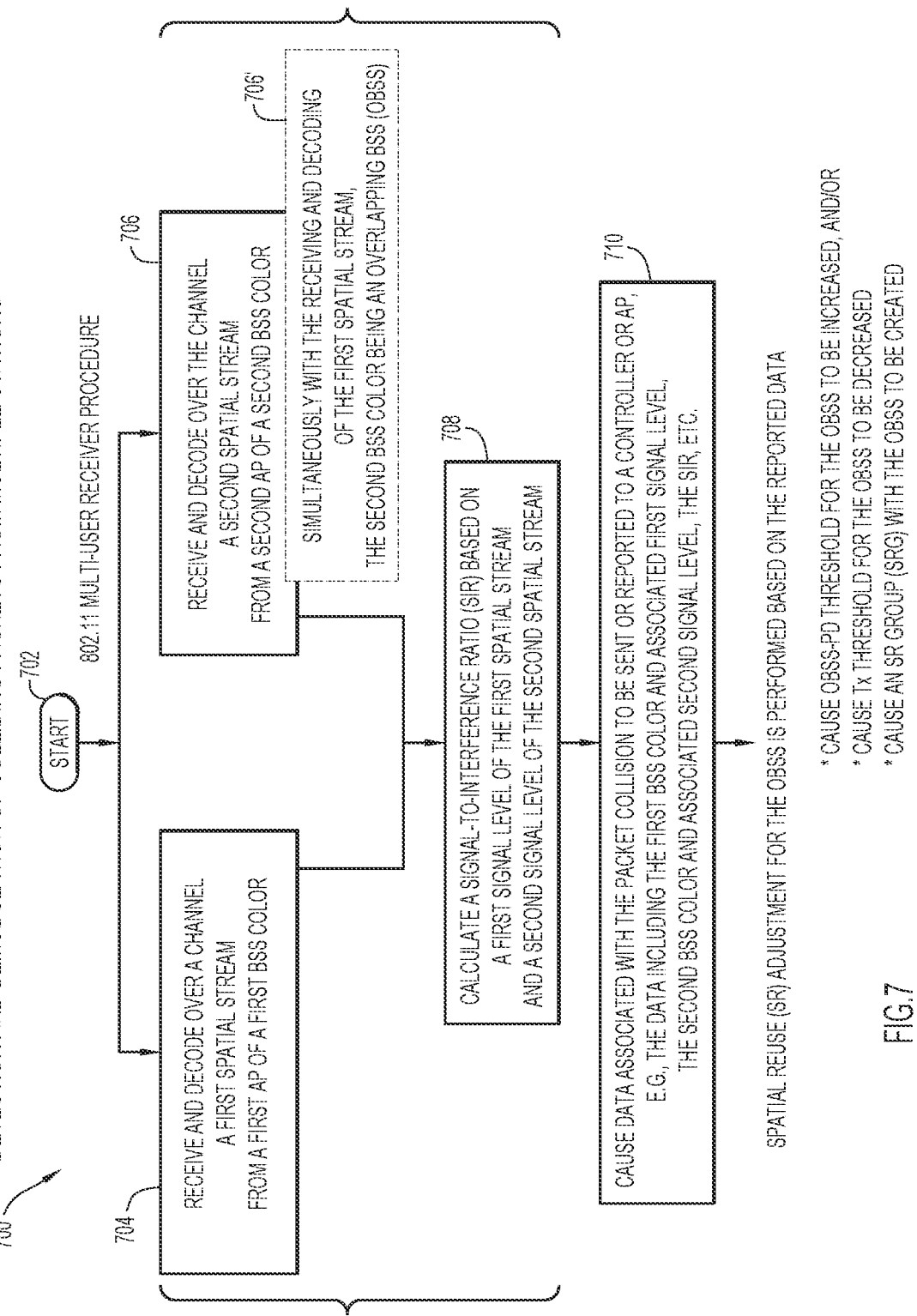
FIG. 7 is a flowchart for describing a method for use in SR optimization in a WLAN with use of an 802.11 multi-user receiver procedure for blind detection and demodulation of colliding packets according to some implementations of the present disclosure.

FIG. 7 is a flowchart 700 for describing a method for use in SR optimization in a WLAN according to some implementations of the present disclosure. The method of FIG. 7 may be performed at each sensor node of a plurality of sensor nodes configured for use in a WLAN. A sensor node may be an AP configured to operate as a sensor (e.g. an AP1800-like sensor) and/or be configured to operate as a client device or STA. A sensor node may include at least one or more processors, one or more memories coupled to the one or more processors, and an 802.11 multi-user receiver configured for blind detection and demodulation of colliding packets from multiple stations. At least part of the method may be embodied as a computer program product including a non-transitory computer readable medium and instructions stored in the computer readable medium, where the instructions are executable on one or more processors for performing the steps of the method.

In the method of FIG. 7, the sensor node may be configured to perform an 802.11 multi-user receiver procedure, for the blind detection and demodulation of colliding packets from multiple stations, where the sensor node reports data back to a controller and/or an AP. Beginning at a start block 702 of FIG. 7, the 802.11 multi-user receiver procedure of the sensor node may involve receiving and decoding, over a channel, a first spatial stream from a first device associated with a first BSS color (step 704 of FIG. 7). The first BSS color may be the BSS of an AP. The 802.11 multi-user receiver procedure of the sensor node may further involve receiving and decoding, over the (same) channel, a second spatial stream from a second device associated with a second BSS color (step 706 of FIG. 7). The receiving and the decoding of the second spatial stream in step 706 may be performed simultaneously with the receiving and the decoding of the first spatial stream in step 704 (step 706[1] of FIG. 7). The second BSS color may an OBSS of the AP. The receipt and decoding of the simultaneous streams of the 802.11 multi-user receiver procedure may indicate actual colliding packets (e.g. colliding PPDUs) from different devices over the same channel. An SIR based on a first signal level associated with the first spatial stream and a second signal level associated with the second spatial stream may be calculated (step 708 of FIG. 7). The sensor node may cause data associated with the packet collision to be sent or reported to a device, such as a controller or AP (step 710 of FIG. 7). The data may include the first BSS color and associated first signal level, the second BSS color and associated signal level, the SIR, etc.

As indicated in FIG. 7, the device (e.g. the controller and/or the AP) may cause an SR adjustment to be performed in the WLAN based on data received from the 802.11 multi-user receiver procedure (step 604 of FIG. 6). The data may include one or more data items such as the first BSS color, its associated first signal level or RSSI, and identification or address of the device; the second BSS color (i.e. OBSS), its associated signal level or RSSI, identification or address of the device; and the SIR, any indication to perform SR adjustment, etc. The SR adjustment may involve an adjustment (e.g. an increase) in the OBSS-PD threshold, an adjustment (e.g. a decrease) in the SR-TX threshold, or a creation of an SRG with the OBSS.

Figure 8A:
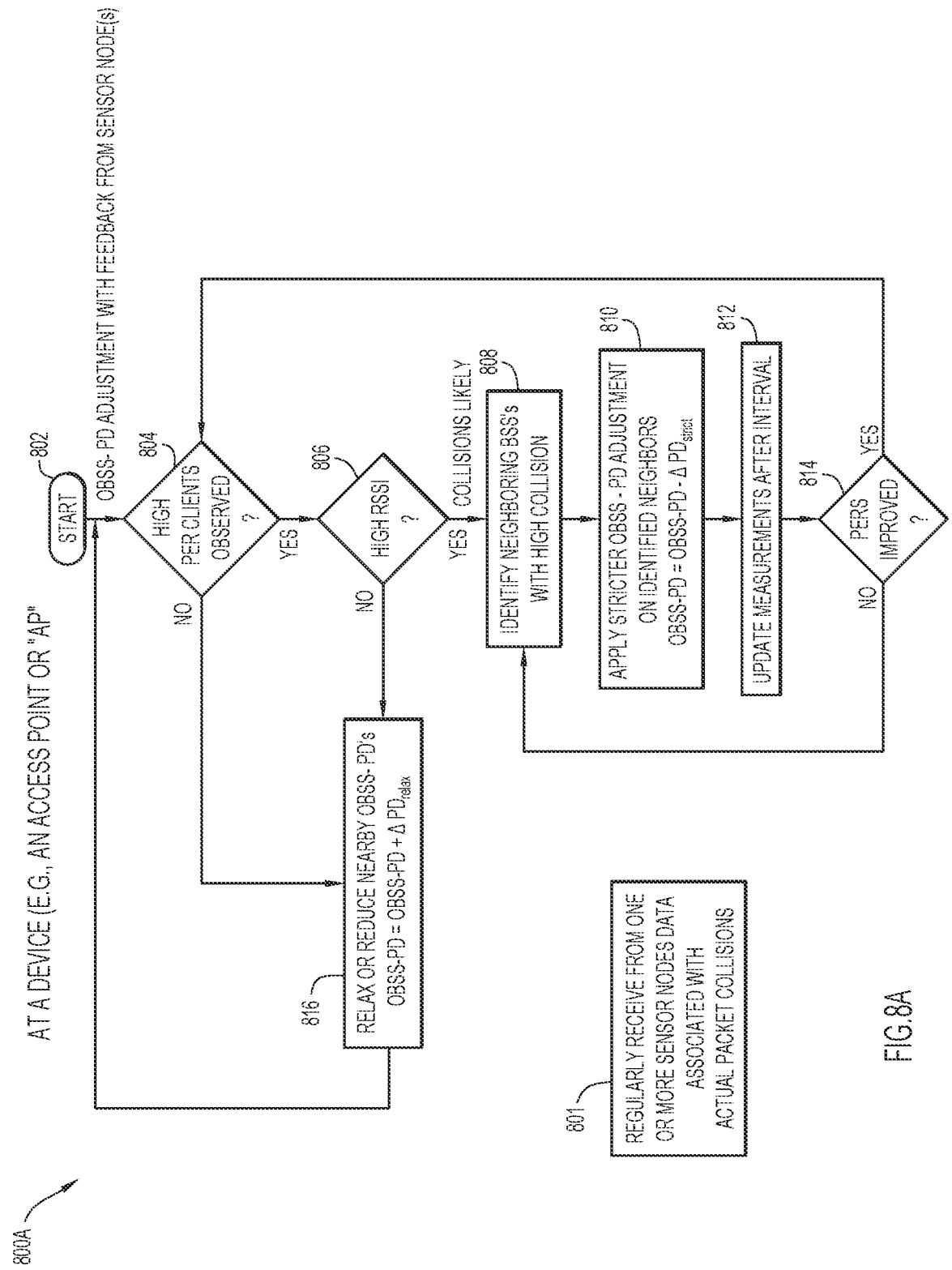

FIGS. 8A and 8B form a flowchart for describing a method for use in SR optimization in a WLAN according to some implementations of the present disclosure. The method of FIGS. 8A-8B may be performed by one or more devices configured for use in a WLAN. For example, the method may be performed by an AP with use of one or more sensors nodes (e.g. evenly) distributed in the WLAN. The device may include at least one or more processors and one or more memories coupled to the one or more processors. The method may be embodied as a computer program product including a non-transitory computer readable medium and instructions stored in the computer readable medium, where the instructions are executable on one or more processors for performing the steps of the method.

In the method of FIGS. 8A and 8B, the sensor nodes may collect data associated with actual colliding packets over the air and report these data to the device (step 801 of FIG. 8A). In some implementations, for each packet transmission, the sensor node may record data which includes the transmitter MAC (if available) or BSS, timing information, and RSSI as detected at the sensor node. In this method, operation based on statistical measurements made over time, in contrast to tracking individual packets.

Beginning at a start block 802 of a flowchart portion 800A of FIG. 8A, the device may identify whether any client devices of the AP's BSS are associated with a relatively high packet error rate (PER) (downlink) (e.g. a PER that is greater than a threshold value) (step 804 of FIG. 8A). If "yes" in step 804, the device may identify whether the RSSI is greater than a threshold value (step 806 of FIG. 8A). If the high PER is simply due to low RSSI, the high PER client device may be ignored (e.g. reciprocity assumed). On the other hand, if the high PER exists in despite an acceptable RSSI, then OBSS collisions are suspected, and the device may inquire whether any neighboring BSSs (i.e. OBSSs) are associated with high packet collisions. Here, the device may perform a procedure (as described later in relation to FIG. 8B) to correlate the records from the sensor nodes that receive signals from the AP's BSS (or specifically the high PER client devices). The device may then identify those BSS's with high collision rates (step 808 of FIG. 8A) and their OBSS-PD levels may be adjusted accordingly as indicated (step 810 of FIG. 8A). Measurements may be updated after a time interval (step 812 of FIG. 8A), and the impact of such adjustments may be observed. If the PERs have not sufficiently improved ("no" at step 814 of FIG. 8A), then steps of the procedure may be repeated at step 808. When high PERs are no longer observed ("yes at step 814 and then step 804), the device may slowly relax or reduce neighboring OBSS-PD thresholds as indicated (step 816 of FIG. 8A). The OBSS-PD thresholds may also be relaxed or reduced if no high RSSI is detected at step 806 of FIG. 8A.

Continuing with a flowchart portion 800B of FIG. 8B, which is an example of step 808 of FIG. 8A, the device may identify a failure event of the AP (step 820 of FIG. 8B). The device attempts to identify, for the failure event, a record from a sensor node which indicates an actual packet collision with other BSSs (step 824 of FIG. 8B). Each BSS is associated with a counter for counting contributions to a failure event. The counter associated with a BSS is incremented if a record is found for it (step 826 of FIG. 8B). Otherwise, if "no" at step 824, then the next failure event is considered at step 820. The device then identifies whether any of a BSS's packet collisions are greater than a percentage threshold value of failure events for the AP (step 828 of FIG. 8B). If "yes" at step 828, the BSS is considered a high collision BSS (step 830 of FIG. 8B). In any event, the next failure event of the AP is considered at step 820.

Figure 9:
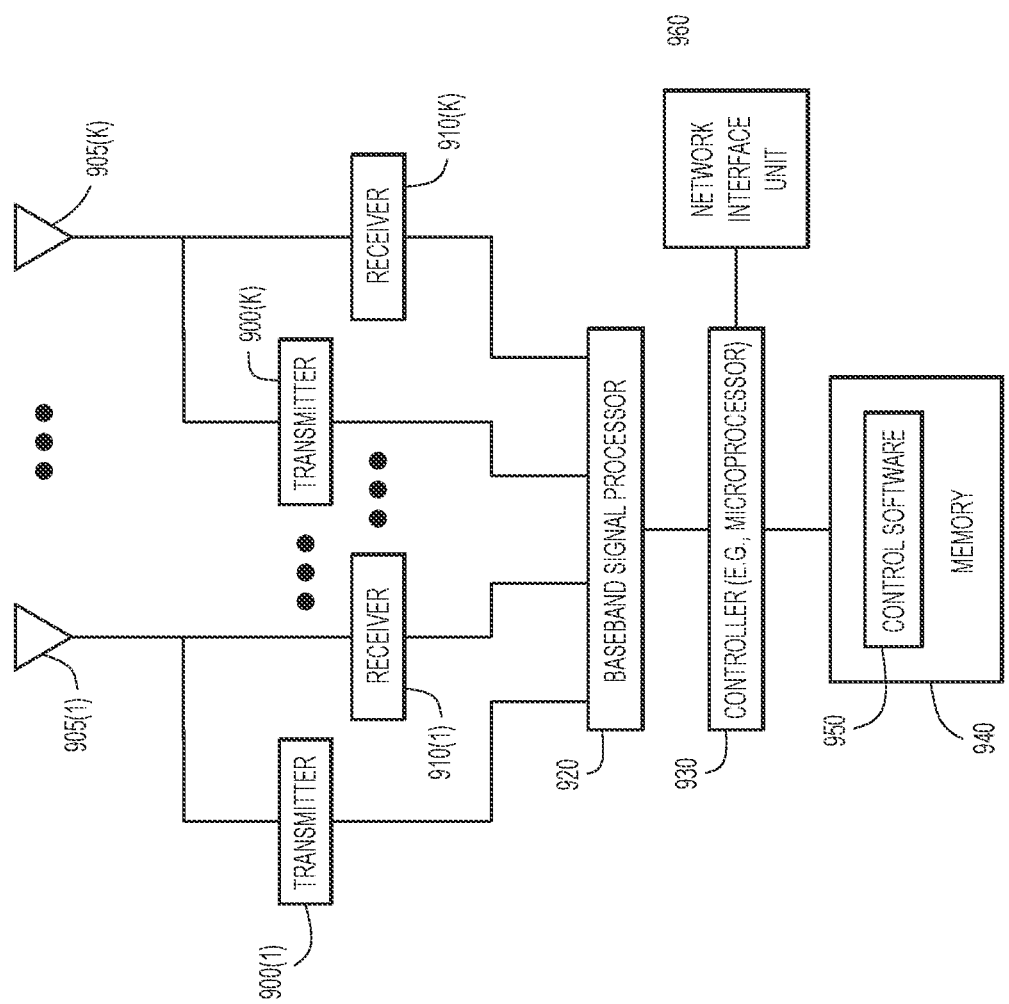
FIG. 9 is a block diagram of a device (e.g. an AP, client device, or sensor node) configured to perform operations as described herein.

Reference is now made to FIG. 9 for a description of a (wireless) device that may be configured to perform operations as described herein. The block diagram shown in FIG. 9 is representative of any of the devices whose operations are described above in connection with the figures, and may be for an AP, a sensor node, or a client device (STA). The device includes a plurality of transmit upconverters 900(1)-900(K) each connected to a corresponding one of the antennas 905(1)-905(K) and a plurality of receive downconverters 910(1)-910(K) each connected to a corresponding one of the antennas 905(1)-905(K). FIG. 9 is meant to cover the case in which a wireless device has multiple antennas and signal processing capabilities for 802.11 multi-user receiver for the blind detection and demodulation of colliding packets from multiple stations, as described above.

A baseband signal processor 920 (e.g., modem) is provided that is connected to the plurality of transmit upconverters 900(1)-900(K) and to the plurality of receive downconverters 910(1)-910(K). The baseband signal processor 920 performs the baseband transmit signal processing of signals to be transmitted via the plurality of antennas 905(1)-905(K), e.g., for MU-MIMO and single user transmissions, and performs the baseband receive processing of signals that are received by the plurality of antennas 905(1)-905(K). The baseband signal processor 920 may take the form of one or more integrated circuits including fixed or programmable digital logic gates to perform various functions such as analog-to-digital conversion, digital-to-analog conversion, Fast Fourier Transform, etc.

A controller 930 is provided that may take the form of one or more microprocessors or microcontrollers. A memory 940 is provided that stores instructions for control software 950. There also is a network interface unit 960 that enables wired network connectivity. Alternatively, the controller may be embodied by one or more integrated circuits including fixed or programmable digital logic gates.

The memory 940 may include read only memory (ROM), random access memory (RAM), magnetic disk storage media devices, optical storage media devices, flash memory devices, electrical, optical, or other physical/tangible memory storage devices. Thus, in general, the memory 940 may include one or more tangible (non-transitory) computer readable storage media (e.g., a memory device) encoded with control software 950 comprising computer executable instructions and when the software is executed (by the controller 930) it is operable to perform the operations described herein.

The signal processing operations described herein may be performed by the baseband signal processor 920 alone using digital signal processing techniques, the controller 930 alone, or partly by the baseband signal processor 920 and party by the controller 930. In one form, the baseband signal processor 920 is implemented in one or more application specific integrated circuits (ASICs).

Figure 10:
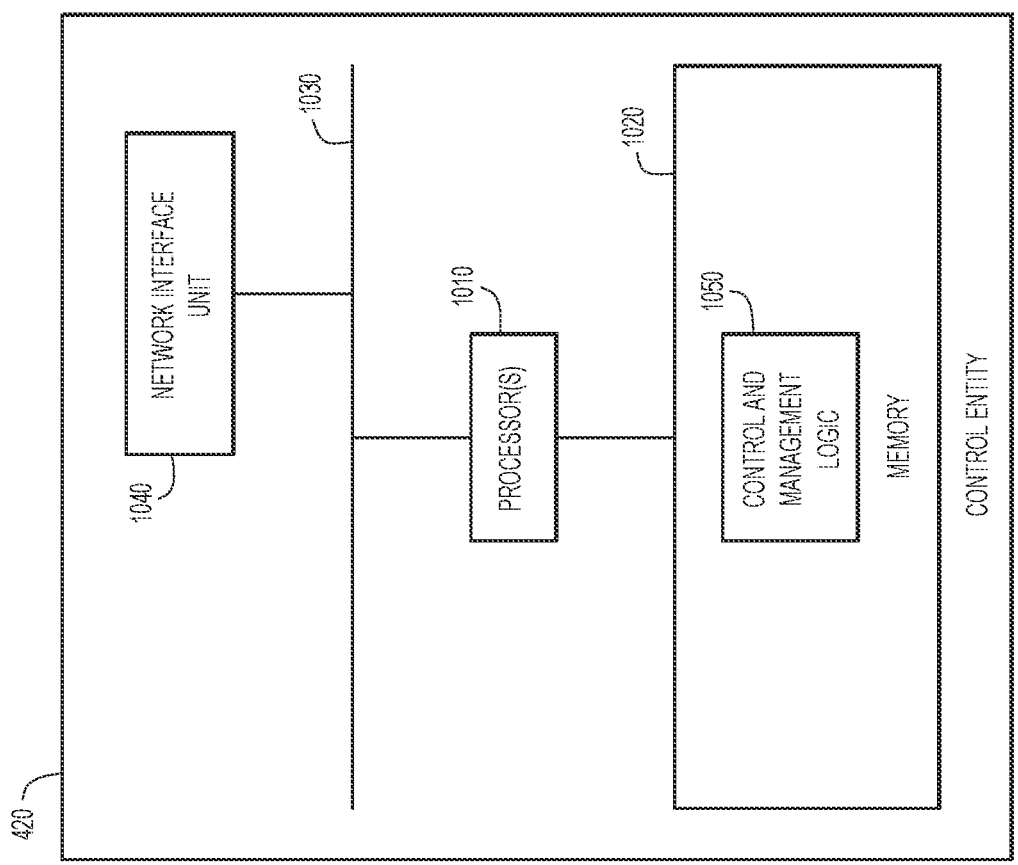
FIG. 10 illustrates a block diagram of a computing/control entity that may perform the functions of a controller (e.g. the controller of FIG. 4) as described herein.

FIG. 10 illustrates a block diagram of a computing/control entity 1000 that may perform the functions of the controller (e.g. controller 420 of FIG. 4) or related entity as described herein. The computing/control entity 1000 includes one or more processors 1010, memory 1020, a bus 1030 and a network interface unit 1040, such as one or more network interface cards that enable network connectivity. The memory 1020 stores instructions for control and management logic 1050, that when executed by the processor 1010, cause the processor to perform the software defined network controller operations described herein.

The memory 1020 may include ROM of any type now known or hereinafter developed, RAM of any type now known or hereinafter developed, magnetic disk storage media devices, tamper-proof storage, optical storage media devices, flash memory devices, electrical, optical, or other physical/tangible memory storage devices. In general, the memory 1020 may comprise one or more tangible (non-transitory) computer readable storage media (e.g., a memory device) encoded with software comprising computer executable instructions and when the software is executed (by the processor 1010) it is operable to perform the network controller operations described herein.

Note that an AP, client device, and/or sensor node may have several separate functional elements, although one or more of the functional elements may be combined and may be implemented by combinations of software-configured elements and/or other hardware elements. Functional elements may refer to one or more processes operating on one or more processing elements. Examples of software and/or hardware configured elements include Digital Signal Processors (DSPs), one or more microprocessors, DSPs, Field-Programmable Gate Arrays (FPGAs), Radio-Frequency Integrated Circuits (RFICs), ASICs, etc.

Thus, techniques for SR optimization in wireless networks, such as IEEE 802.11ax based networks, with use of sensor nodes and/or actual packet collision measurements have been described.

In one illustrative example, a device configured for use in a WLAN may cause a SR adjustment to be performed based on data received from an 802.11 multi-user receiver procedure for the blind detection and demodulation of colliding packets from multiple stations. The 802.11 multi-user receiver procedure may be performed by an AP and/or one or more sensor nodes, each having a wireless transceiver which includes an 802.11 multi-user receiver configured for blind detection and demodulation of colliding packets. The procedure may involve receiving and decoding, over a channel, a first spatial stream from a first device associated with a first base service set (BSS) color; simultaneously receiving and decoding, over the channel, a second spatial stream from a second device associated with a second BSS color (i.e. an overlapping BSS or "OBSS"); and calculating an SIR based on the signal levels associated with the first and the second spatial streams. An SR adjustment may be performed based on an identification that the SIR is outside a limit set by a threshold value. The SR adjustment may involve adjusting an OBSS-Packet Detect (OBSS-PD) threshold associated with the OBSS, adjusting an SR-TX threshold value for the OBSS to be decreased, or causing a SR group (SRG) with the OBSS to be created.

In another illustrative example, a device (e.g. a sensor node, and/or an AP) of the present disclosure may include one or more processors and a wireless transceiver which includes an 802.11 multi-user receiver configured for blind detection and demodulation of colliding packets from multiple stations. The one or more processors may be configured to control operation of the wireless transceiver to receive and decode, over a channel, a first spatial stream from a first device associated with a first BSS color; receive and decode, over the channel, a second spatial stream from a second device associated with a second BSS color, simultaneously with the receiving and the decoding of the first spatial stream; and calculate a SIR based on a first signal level associated with the first spatial stream and a second signal level associated with the second spatial stream. The second BSS color may be an OBSS, and the simultaneous receiving and decoding of the first and the second spatial streams over the channel may indicate actual packet collisions of the first and the second devices. The one or more processors may be further configured to cause data associated with the packet collisions to be sent to at least one of a controller or an access point (AP) of the WLAN, for use in performing an SR adjustment in the WLAN.

In yet another illustrative example, an AP of the present disclosure may include one or more processors and a wireless transceiver which includes an 802.11 multi-user receiver configured for blind detection and demodulation of colliding packets from multiple stations. The one or more processors may be configured to control operation of the wireless transceiver to receive and decode, over a channel, a first spatial stream from a first device associated with a first BSS color of the AP; receive and decode, over the channel, a second spatial stream from a second device associated with a second BSS color, simultaneously with the receiving and the decoding of the first spatial stream; and calculate a SIR based on a first signal level associated with the first spatial stream and a second signal level associated with the second spatial stream. The second BSS color may be an OBSS, and the simultaneous receiving and decoding of the first and the second spatial streams over the channel may indicate actual packet collisions of the first and the second devices. The one or more processors may be further configured to perform an SR adjustment based on identifying that the SIR is outside a limit set by a threshold value. The SR adjustment may be performed by causing an OBSS-PD threshold value associated with the OBSS to be increased; causing an SR-TX threshold value for the OBSS to be decreased; and/or causing an SRG with the OBSS to be created. Here, the AP may be further configured to perform the SR adjustment based on data received from an 802.11 multi-user receiver procedure performed by one or more sensor nodes in the WLAN.

Note that, although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are used to distinguish one element from another. For example, first spatial stream could be termed second spatial stream, and similarly, second spatial stream could be termed first spatial stream, without changing the meaning of the description, so long as all occurrences of the "first spatial stream" are renamed consistently and all occurrences of the "second spatial stream" are renamed consistently. The first spatial stream and second spatial stream are both spatial streams, but they are not the same spatial stream.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a controller configured for control of a wireless local area network (WLAN) including a plurality of access points (APs) and further including one or more wireless network sensors, each wireless network sensor having a multi-user receiver configured for blind detection and demodulation of packets that collide in time,
      causing a spatial reuse (SR) adjustment to be performed based on data received from the one or more wireless network sensors and generated from a multi-user receiver procedure for the blind detection and demodulation of packets that collide in time, the multi-user receiver procedure involving:
         receiving and decoding, over a channel, one or more first protocol data units of a first spatial stream from a first device associated with a first base service set (BSS) color;
         receiving and decoding, over the channel, one or more second protocol data units of a second spatial stream from a second device associated with a second BSS color, simultaneously with the receiving and the decoding of the one or more first protocol data units the first spatial stream, such that the one or more first protocol data units of the first spatial stream and the one or more second protocol data units of the second spatial stream are simultaneously captured while colliding in time, the second BSS color being associated with an overlapping BSS (OBSS); and
         calculating a signal-to-interference ratio based on a first signal level associated with the one or more first protocol data units of the first spatial stream and a second signal level associated with the one or more second protocol data units of the second spatial stream.

2. The method of claim 1, wherein causing the SR adjustment to be performed based on the data comprises signaling one of the plurality of APs in the WLAN to perform the SR adjustment.

3. The method of claim 1, wherein the controller is configured for control of the WLAN which further includes the one or more wireless network sensors that operate as clients or stations (STAs) for monitoring in the WLAN.

4. The method of claim 1, wherein the multi-user receiver of each of the one or more wireless network sensors is configured for the blind detection and demodulation of packets that collide in time, without reliance on a-priori channel state information.

5. The method of claim 1, wherein the data received from the one or more wireless network sensors comprises one or more of the following: the first BSS color, the second BSS color, the first signal level, the second signal level, and the signal-to-interference ratio.

6. The method of claim 1, wherein causing the SR adjustment to be performed comprises:
   causing an OBSS-Packet Detection (PD) (OBSS-PD) threshold value associated with the OBSS to be increased.

7. The method of claim 1, wherein causing the SR adjustment to be performed comprises:
   causing an SR transmission (SR-TX) threshold value for the OBSS to be decreased.

8. The method of claim 1, wherein causing the SR adjustment to be performed comprises:
   causing an SR group (SRG) to be formed with the OBSS.

9. The method of claim 1, wherein:
   the one or more first protocol data units of the first spatial stream comprise one or more first Physical Layer Convergence Procedure (PLCP) Protocol Data Units (PDUs) (PPDUs),
   the one or more second protocol data units of the second spatial stream comprise one or more second PPDUs that collide in time with the one or more first PPDUs.

10. A wireless network sensor comprising:
    one or more processors;
    a wireless transceiver configured for wireless communications in a wireless local area network (WLAN), the wireless transceiver including a multi-user receiver configured for blind detection and demodulation of packets that collide in time;
    the one or more processors being configured to control the wireless transceiver including the multi-user receiver of the wireless network sensor to:
       receive and decode, over a channel, one or more first protocol data units of a first spatial stream from a first device associated with a first base service set (BSS) color;
       receive and decode, over the channel, one or more second protocol data units of a second spatial stream from a second device associated with a second BSS color, simultaneously with the receiving and decoding of the one or more first protocol data units of the first spatial stream, such that the one or more first protocol data units of the first spatial stream and the one or more second protocol data units of the second spatial stream are simultaneously captured while colliding in time, indicating actual packet collisions between the first and the second spatial streams, the second BSS color being associated with an overlapping BSS (OBSS);
       calculate a signal-to-interference ratio based on a first signal level associated with the one or more first protocol data units of the first spatial stream and a second signal level associated with the one or more second protocol data units of the second spatial stream; and cause data associated with the first and the second spatial streams that indicate the actual packet collisions to be sent to at least one of a controller or an access point (AP) for use in performing a spatial reuse (SR) adjustment for the WLAN.

11. The wireless network sensor of claim 10, which operates as a client or station (STA) for the blind detection and demodulation of packets that collide in time.

12. The wireless network sensor of claim 10, wherein the one or more processors are configured to control the wireless transceiver including the multi-user receiver to cause the data associated with the first and the second spatial streams that indicate the actual packet collisions to be sent to the controller for the WLAN, for use in performing the SR adjustment for the WLAN.

13. The wireless network sensor of claim 10, wherein the data comprises one or more of the following: the first BSS color, the second BSS color, the signal-to-interference ratio, an address of the first device, and an address of the second device.

14. An access point (AP) comprising:
one or more processors;
a wireless transceiver configured to provide wireless communications for a wireless local area network (WLAN), the wireless transceiver including a multi-user receiver configured for blind detection and demodulation of packets that collide in time;
the one or more processors being configured to control operation of the wireless transceiver including the multi-user receiver of the AP to:
receive and decode, over a channel, one or more first protocol data units of a first spatial stream from a first device associated with a first base service set (BSS) color;
receive and decode, over the channel, one or more second protocol data units of a second spatial stream from a second device associated with a second BSS color, simultaneously with the receiving and decoding of the one or more first protocol data units of the first spatial stream, such that the one or more first protocol data units of the first spatial stream and the one or more second protocol data units of the second spatial stream are simultaneously captured while colliding in time, the second BSS color being associated with an overlapping BSS (OBSS);
calculate a signal-to-interference ratio based on a first signal level associated with the one or more first protocol data units of the first spatial stream and a second signal level associated with the one or more second protocol data units of the second spatial stream; and
cause a spatial reuse (SR) adjustment to be performed based on an identification that the signal-to-interference ratio is outside a limit set by a threshold value.

15. The AP of claim 14, wherein the simultaneous receiving and decoding of the one or more first protocol data units of the first spatial stream and the one or more second protocol data units of the second spatial stream over the channel indicates actual packet collisions between the first and the second spatial streams.

16. The AP of claim 14, wherein the one or more processors configured to control operation of the wireless transceiver including the multi-user receiver are configured to perform the SR adjustment by:
causing an OBSS-Packet Detection (PD) (OBSS-PD) threshold associated with the OBSS to be increased.

17. The AP of claim 14, wherein the one or more processors configured to control operation of the wireless transceiver including the multi-user receiver are configured to perform the SR adjustment by:
causing an SR transmission (SR-TX) threshold value for the OBSS to be decreased.

18. The AP of claim 14, wherein the one or more processors configured to control operation of the wireless transceiver including the multi-user receiver are configured to perform the SR adjustment by:
causing an SR group (SRG) with the OBSS to be created.

19. The AP of claim 14, which is compliant with IEEE 802.11ax.

20. The AP of claim 15, wherein the one or more processors configured to control operation of the wireless transceiver including the multi-user receiver are configured to:
cause data associated with the first and the second spatial streams that indicate the actual packet collisions to be sent to a controller for the WLAN, for use in performing the SR adjustment in the WLAN.

* * * * *